United States Patent
Osanai et al.

[11] Patent Number: 6,148,909
[45] Date of Patent: Nov. 21, 2000

[54] TEMPERATURE CONTROL DEVICE AND TEMPERATURE CONTROL METHOD

[75] Inventors: Masashi Osanai; Shunsuke Miyamoto, both of Hiratsuka; Tomohisa Sato, Chigasaki; Hiroaki Takechi, Hadano; Tsutomu Hatanaka, Hiratsuka; Norio Takahashi, Hiratsuka; Toshiyuki Kamei, Hiratsuka; Takumi Sugihara, Hiratsuka; Isao Shibata, Hiratsuka; Hironori Akiba, Kawaguchi, all of Japan

[73] Assignee: Komatsu Ltd., Tokyo, Japan

[21] Appl. No.: 09/236,371

[22] Filed: Jan. 25, 1999

[30]   Foreign Application Priority Data

Jan. 27, 1998 [JP] Japan .................................. 10-014133
Oct. 23, 1998 [JP] Japan .................................. 10-302586

[51] Int. Cl.$^7$ ...................................................... F25B 29/00
[52] U.S. Cl. .......................... 165/263; 165/297; 165/300; 62/434
[58] Field of Search .............................. 165/63, 64, 263, 165/297, 299, 300; 62/434, 435

[56]       References Cited

U.S. PATENT DOCUMENTS

3,882,930   5/1975   Schexnayder ..................... 165/300 X
4,415,847  11/1983   Galloway .......................... 165/300 X
4,984,628   1/1991   Uchida et al. ....................... 62/434 X
5,137,079   8/1992   Anderson ............................. 165/297
5,706,883   1/1998   Ward ................................... 62/434 X Primary Examiner—Ira S. Lazarus
Assistant Examiner—Ljiljana V. Ciric
Attorney, Agent, or Firm—Diller, Ramik & Wight, PC

[57]          ABSTRACT

A temperature control system which performs control of an object whose temperature is to be controlled as accurately as possible. The system comprises: a chiller located in a fluid circulating and supplying system, for cooling a thermal fluid returning from a vacuum chamber, a first flow control valve located in the fluid circulating and supplying system in a position between the chiller and the vacuum chamber, a bypass passage for splitting and supplying thermal fluid returning from the vacuum chamber to a position between the first flow control valve and the vacuum chamber, before it reaches the chiller, a second flow control valve located in the bypass passage, and a halogen lamp heater located in the fluid circulating and supplying system in a position between a confluence point of the bypass passage and the vacuum chamber, for adjusting the temperature of the thermal fluid passing therethrough to a set temperature.

14 Claims, 8 Drawing Sheets

TEMPERATURE CONTROL DEVICE AND TEMPERATURE CONTROL METHOD

BACKGROUND OF THE INVENTION

1. Field of the Invention

The present invention relates to improvements in a temperature control device and temperature control method comprising a fluid circulating and supplying system for circulating and supplying a thermal fluid adjusted to a prescribed set temperature to an object whose temperature is to be controlled, which controls a temperature of the object whose temperature is to be controlled by means of the thermal fluid supplied by the fluid circulating and supplying system.

2. Description of the Related Art

A thermal fluid, such as air supplied to a thermostatic chamber, or a thermal fluid, such as water or FLUORINART (registered trademark) used in controlling the air conditions or side wall temperature of a chamber employed in the manufacture of semiconductor devices, liquid crystal devices, or the like, must be controlled to a target temperature according to its respective object. Therefore, in a semiconductor manufacturing system, for example, a circulating and supplying system for the thermal fluid is adopted, whereby the thermal fluid used for temperature control of the chamber is caused to flow into a heat exchanger, such as a heater, chiller, or the like, the thermal fluid is adjusted to a desired temperature in the heat exchanger, and the thermal fluid is then supplied to the chamber.

Prior art of this kind is disclosed in Japanese Patent Application Laid-open No. 62-297912, for example. In the prior art, a high-thermal fluid heated by a heater and a low-thermal fluid cooled by a cooler are mixed by means of a high-temperature flow regulating value and a low-temperature flow regulating valve, respectively, and this mixed fluid is circulated and supplied to an object whose temperature is to be controlled.

By means of this prior art, it is possible to adjust the temperature of a thermal fluid supplied to an object whose temperature is to be controlled, by adjusting the respective degrees of opening of the high-temperature flow regulating valve and the low-temperature flow regulating valve.

In systems, such as the prior art described above, wherein the temperature of a thermal fluid supplied to an object whose temperature is to be controlled is adjusted simply by controlling the respective degrees of opening of flow regulating valves, there is a risk that situations may arise where the thermal fluid cannot be controlled to a desired temperature due to reasons such as the following.

(1) Limits of performance resolution of flow regulating valves

In other words, the flow-rate of the thermal fluid passing through a flow regulating valve does not necessarily correspond to the degree of opening of the valve; for instance, there is a large out-flow of thermal fluid even when the valve opening is increased only slightly.

(2) Presence of hysteresis

In other words, in a case where the opening has changed from a small opening to a large opening and a case where it has changed from a large opening to a small opening, then even if the resulting degree of opening of the flow regulating valve is the same, there will be a disparity between the two cases in the flow-rate of thermal fluid passing through the flow regulating valve.

(3) Effects of pressure

In other words, when pressure fluctuations arise due to the circulating and supplying pump, then differences will arise in the flow-rate of the thermal fluid passing through the flow regulating valve, even in a state where the flow regulating valve is maintained at the same degree of opening.

In cases of this kind, the combination ratio between the thermal fluid passing through the high-temperature flow regulating valve and the thermal fluid passing through the low-temperature flow regulating valve fluctuates, and hence it is difficult to control the thermal fluid supplied to the temperature-controlled object to a prescribed temperature.

Moreover, in the prior art described above, since the temperature of the thermal fluid is controlled by adjusting the degree of opening of both flow regulating valves, then both flow regulating valves are operating constantly, which is very disadvantageous from the viewpoint of durability, in that it brings about early wearing, and the like.

SUMMARY OF THE INVENTION

The present invention was devised with the foregoing in view, an object thereof being to provide a temperature control device and a temperature control method whereby an object whose temperature is to be controlled can be controlled as accurately as possible.

A further object of the present invention is to provide a temperature control device and a temperature control method, whereby an object whose temperature is to be controlled can be controlled as accurately as possible, without impairing the durability of flow ratio regulating means, such as valves, or the like.

A first aspect of the invention is a temperature control device provided with a fluid circulating and supplying system for circulating and supplying a thermal fluid adjusted to a prescribed set temperature from and to an object whose temperature is to be controlled, which controls a temperature of the object whose temperature is to be controlled by means of the thermal fluid supplied by the fluid circulating and supplying system, comprising: first heat exchanging means, located in the fluid circulating and supplying system, for carrying out heat exchange with thermal fluid returning from the object whose temperature is to be controlled; second heat exchanging means located in the fluid circulating and supplying system in a position leading from the first heat exchanging means to the object whose temperature is to be controlled, for adjusting the thermal fluid to a set temperature by carrying out heat exchange with thermal fluid passing therethrough; a bypass passage for splitting and supplying thermal fluid in the fluid circulating and supplying system from a position leading from the object whose temperature is to be controlled to the first heat exchanging means, to a position leading from the first heat exchanging means to the second heat exchanging means; and flow ratio regulating means for regulating a flow ratio between the thermal fluid passing through the first heat exchanging means and the thermal fluid passing through the bypass passage.

According to the first aspect of the invention, since a temperature of the thermal fluid is finally adjusted by the second heat exchanging means after the thermal fluid having passed through the first heat exchanging means and the thermal fluid having passed through the bypass passage have been combined, it is possible to control the temperature of the object whose temperature is to be controlled, accurately, regardless of fluctuations in the flow-rate of the thermal fluid passing through the first heat exchanging means and the bypass passage.

A second aspect of the invention further comprises, in the first aspect of the invention described above: output controlling means for detecting a temperature of thermal fluid supplied to the object whose temperature is to be controlled and controlling an output of the second heat exchanging means on the basis of a detection result in such a manner that the temperature of the thermal fluid is adjusted to the set temperature; and flow ratio controlling means for detecting the output of the second heat exchanging means and controlling the drive of the flow ratio regulating means, in cases where the detection result lies outside a previously determined output range, in such a manner that the output of the second heat exchanging means moves within the output range.

According to the second aspect of the invention, in a steady state, the temperature of the thermal fluid is adjusted by controlling the output of the second heat exchanging means, and driving of the flow ratio regulating means is controlled only in cases where the output of the second heat exchanging means lies outside a previously determined output range, this being advantageous in terms of the durability of the flow ratio regulating means.

Here, the flow ratio controlling means may be composed such that it detects the output of the second heat exchanging means in a sequential fashion after the processing of the output controlling means has been completed, as in a third aspect of the invention, or the flow ratio controlling means may be composed such that, when the output controlling means is carrying out processing, it detects the output of the second heat exchanging means intermittently, in parallel with the processing of the output controlling means, as in a fourth aspect of the invention.

A fifth aspect of the invention adopts a chiller for cooling thermal fluid returning from the object whose temperature is to be controlled, as the first heat exchanging means, and it adopts a halogen lamp heater for heating and adjusting thermal fluid supplied to the object whose temperature is to be controlled by means of a halogen lamp, as the second heat exchanging means.

According to the fifth aspect of the invention, since the temperature of the thermal fluid can be adjusted with good response characteristics by means of a halogen lamp heater, it is possible to control the temperature of the object whose temperature is to be controlled with even greater accuracy.

A sixth aspect of the invention further comprises, in the first aspect of the invention described above, fluid combining means for combining thermal fluid which has passed through the first heat exchanging means, in a position leading from the first heat exchanging means to a confluence point of the bypass passage in the fluid circulating and supplying system.

According to the sixth aspect of the invention, since fluctuations in the temperature of the thermal fluid from the first heat exchanging means are suppressed and absorbed by fluid combining means, it is possible to control the temperature of the object whose temperature is to be controlled with even greater accuracy.

Here, it is possible to provide, as flow regulating means, a first flow control valve located in the fluid circulating and supplying system in a position leading from a branching point of the bypass passage to a confluence point of the bypass passage, and a second flow control valve located in the bypass passage, as in a seventh aspect of the invention, or a three-way valve located either at a branching point of the bypass passage or at a confluence point of the bypass passage, in the fluid circulating and supplying system, as in an eighth aspect of the invention.

In a ninth aspect of the invention, the fluid circulating and supplying system in the first aspect of the invention described above further comprises, in a position leading from a confluence point of the bypass passage to a branching point of the bypass passage, fluid circulating and supplying means for generating a circulation of thermal fluid, and pressure absorbing means, located in a position immediately before the fluid circulating and supplying means, for absorbing pressure fluctuations in the thermal fluid generated inside the fluid circulating and supplying system.

According to the ninth aspect of the invention, it is possible to maintain the inlet section of the fluid circulating and supplying means at atmospheric pressure at all times, thereby preventing situations where there is a decline in the supply efficiency of the thermal fluid from the fluid circulating and supplying means.

In this case, by adopting pressure absorbing means comprising a connecting passage linked to the fluid circulating and supplying system, and a pressure absorber coupled to the fluid circulating and supplying system via the connecting passage for absorbing pressure fluctuations in the thermal fluid by means of changing its volume, as in a tenth aspect of the invention, it is possible to prevent temperature variations from affecting the pressure absorber.

In an eleventh aspect of the invention, the fluid circulating and supplying system in the first aspect of the invention described above further comprises, in a position leading from a confluence point of the bypass passage to a branching point of the bypass passage, fluid circulating and supplying means for generating a circulation of thermal fluid; and a supply bypass passage for splitting and supplying thermal fluid in the fluid circulating and supplying system from a position leading from the fluid circulating and supplying means to the object whose temperature is to be controlled, to a position leading from the object whose temperature is to be controlled to the fluid circulating and supplying means.

According to the eleventh aspect of the invention, it is possible to reduce the load on the fluid circulating and supplying means, even in cases where there is a significant loss of pressure in the object whose temperature is to be controlled.

In this case, by adopting a supply bypass passage which splits and supplies thermal fluid in the fluid circulating and supplying system from a position leading from the confluence point of the bypass passage to the object whose temperature is to be controlled, to a position leading from the object whose temperature is to be controlled to the branching point of the bypass passage, as in the twelfth aspect of the invention, no variations occur in the total flow-rate of the thermal fluid regulated by the flow ratio regulating means. Therefore, it is possible to regulate the flow ratio of the thermal fluid accurately, and hence to control the temperature of the thermal fluid accurately, without adopting a separate flow-rate sensor.

A thirteenth aspect of the invention is a temperature control method for controlling a temperature of an object whose temperature is to be controlled by means of a thermal fluid supplied by a fluid circulating and supplying system, wherein the fluid circulating and supplying system which circulates and supplies thermal fluid from and to the object whose temperature is to be controlled contains: first heat exchanging means for carrying out heat exchange with thermal fluid returning from the object whose temperature is to be controlled; second heat exchanging means located in a position leading from the first heat exchanging means to the object whose temperature is to be controlled, for carrying out heat exchange with thermal fluid passing therethrough; a bypass passage for splitting and supplying thermal fluid in the fluid circulating and supplying system from a position leading from the object whose temperature is to be controlled to the first heat exchanging means, to a position leading from the first heat exchanging means to the second heat exchanging means; and flow ratio regulating means for regulating a flow ratio between the thermal fluid passing through the first heat exchanging means and the thermal fluid passing through the bypass passage; the temperature control method comprising: output controlling step of detecting a temperature of the thermal fluid supplied to the object whose temperature is to be controlled and controlling an output of the second heat exchanging means on the basis of the detected temperature in such a manner that the thermal fluid supplied to the object whose temperature is to be controlled is adjusted to a prescribed set temperature; output detecting step of detecting the output of the second heat exchanging means after the output controlling step has been completed; and flow ratio controlling step of controlling the drive of the flow ratio regulating means, in cases where the detected output lies outside a previously determined output range, in such a manner that the output of the second heat exchanging means moves within the output range.

According to the thirteenth aspect of the invention, since, in a steady state, the temperature of the thermal fluid is regulated by controlling the output of the second heat exchanging means, and driving of the flow ratio regulating means is controlled only in cases where the output of the second heat exchanging means lies outside a previously determined output range, it is possible to control the temperature of the object whose temperature is to be controlled, accurately, without impairing the durability of the flow ratio regulating means.

A fourteenth aspect of the invention is a temperature control method for controlling a temperature of an object whose temperature is to be controlled by means of a thermal fluid supplied by a fluid circulating and supplying system, wherein the fluid circulating and supplying system which circulates and supplies thermal fluid from and to the object whose temperature is to be controlled contains: first heat exchanging means for carrying out heat exchange with thermal fluid returning from the object whose temperature is to be controlled; second heat exchanging means located in a position leading from the first heat exchanging means to the object whose temperature is to be controlled, for carrying out heat exchange with thermal fluid passing therethrough; a bypass passage for splitting and supplying thermal fluid in the fluid circulating and supplying system from a position leading from the object whose temperature is to be controlled to the first heat exchanging means, to a position leading from the first heat exchanging means to the second heat exchanging means; and flow ratio regulating means for regulating a flow ratio between the thermal fluid passing through the first heat exchanging means and the thermal fluid passing through the bypass passage; the temperature control method comprising: output controlling step of detecting a temperature of the thermal fluid supplied to the object whose temperature is to be controlled and controlling an output of the second heat exchanging means on the basis of the detected temperature in such a manner that the thermal fluid supplied to the object whose temperature is to be controlled is adjusted to a prescribed set temperature; output detecting step of detecting the output of the second heat exchanging means, intermittently, in parallel with the output controlling step; and flow ratio controlling step of controlling the drive of the flow ratio regulating means, in cases where the detected output lies outside a previously determined output range, in such a manner that the output of the second heat exchanging means moves within the output range.

According to the fourteenth aspect of the invention also, since, in a steady state, the temperature of the thermal fluid is regulated by controlling the output of the second heat exchanging means, and driving of the flow ratio regulating means is controlled only in cases where the output of the second heat exchanging means lies outside a previously determined output range, it is possible to control the temperature of the object whose temperature is to be controlled, accurately, without impairing the durability of the flow ratio regulating means.

DESCRIPTION OF THE PREFERRED EMBODIMENTS

Below, the present invention is described in detail on the basis of the drawings, which depict embodiments.

Figure 1:
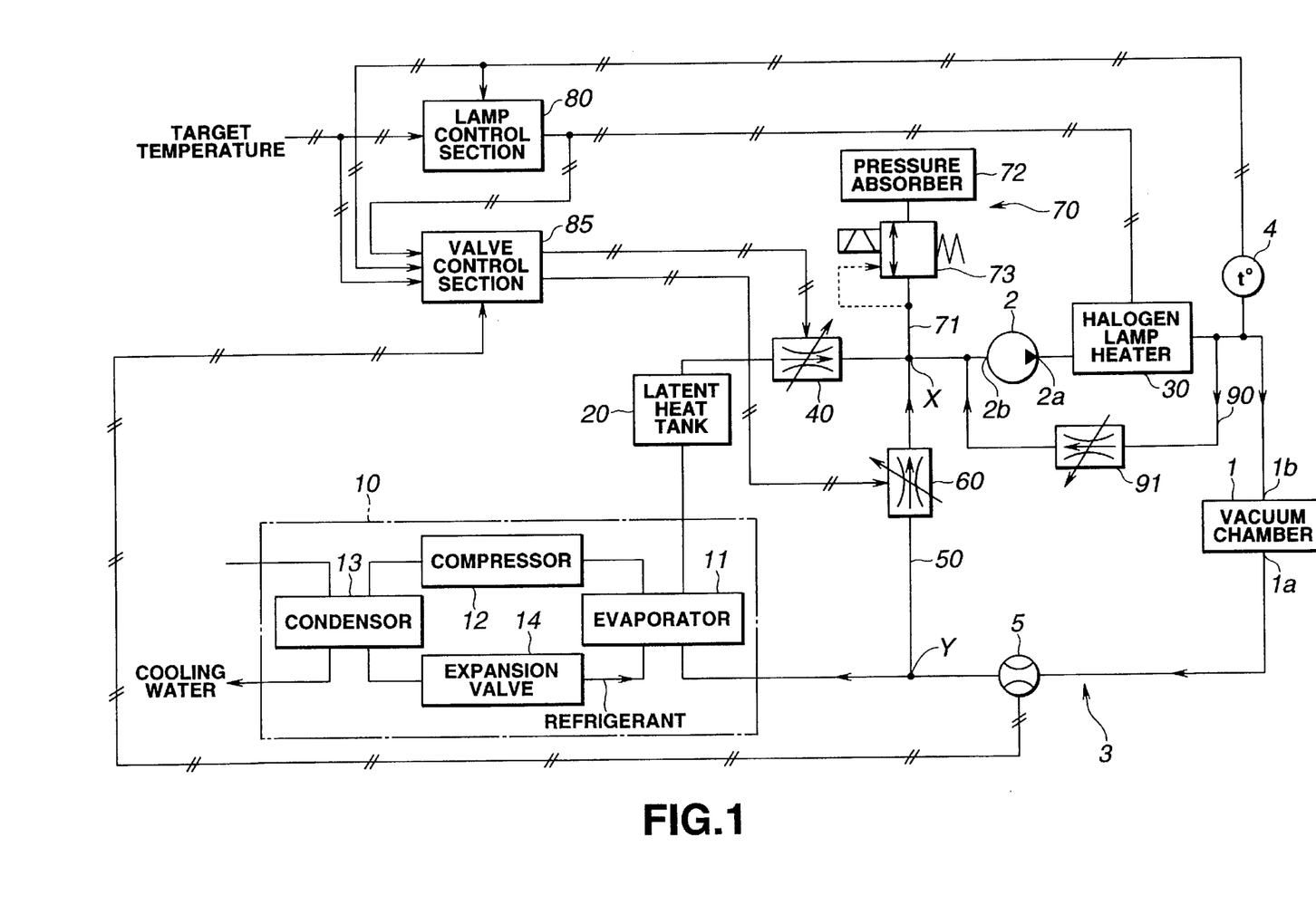
FIG. 1 is a circuit diagram showing a first embodiment of a temperature control device relating to the present invention.

FIG. 1 shows a first embodiment of a temperature control device relating to the present invention, which is a temperature control device for circulating and supplying a thermal fluid to a vacuum chamber (object whose temperature is to be controlled) used when carrying out various semiconductor processing on semiconductor wafers, and maintaining the semiconductor wafers constantly in a target temperature state, such as a low-temperature state (−20–20° C.), a medium-temperature state (0–60° C.), or a high-temperature state (60–80° C.), in accordance with the processing being carried out, by means of the supplied thermal fluid. For the thermal fluid circulated and supplied to the vacuum chamber 1, it is possible to select a suitable fluid according to the target temperature of the temperature control operation, from liquids, such as Fluorinart (registered trademark), ethylene glycol, oil, water, and the like, and gases, such as nitrogen, air, helium, and the like.

As the drawings illustrate, this temperature control device comprises a fluid circulating and supplying system 3, which circulates and supplies a thermal fluid to a vacuum chamber 1 by the action of a fluid circulating and supplying pump (fluid circulating and supplying means) 2. In this fluid circulating and supplying system 3, a chiller 10, latent heat tank (fluid combining means) 20 and a halogen lamp heater 30 are provided, in this order, from the discharge output 1a of the vacuum chamber 1.

The chiller 10 comprises an evaporator 11, a compressor 12, a condenser 13 and an expansion valve 14, and it cools the thermal fluid in the evaporator 11 returned from the vacuum chamber 1. The chiller 10 is located in the fluid circulating and supplying system 3 described above in a position leading from the discharge outlet 1a of the vacuum chamber 1 to the fluid circulating and supplying pump 2.

The latent heat tank 20 holds thermal fluid having heat energy, and it is located in the fluid circulating and supplying system 3 described above in a position between the chiller 10 and the fluid circulating and supplying pump 2. The latent heat tank 20 causes thermal fluid which has passed through the chiller 10 to mix with thermal fluid which has accumulated inside the tank 20, and by exchange of heat energy through the interaction of the thermal fluids, it performs the action of smoothing and absorbing temperature fluctuations in the thermal fluid passing therethrough.

Figure 2:
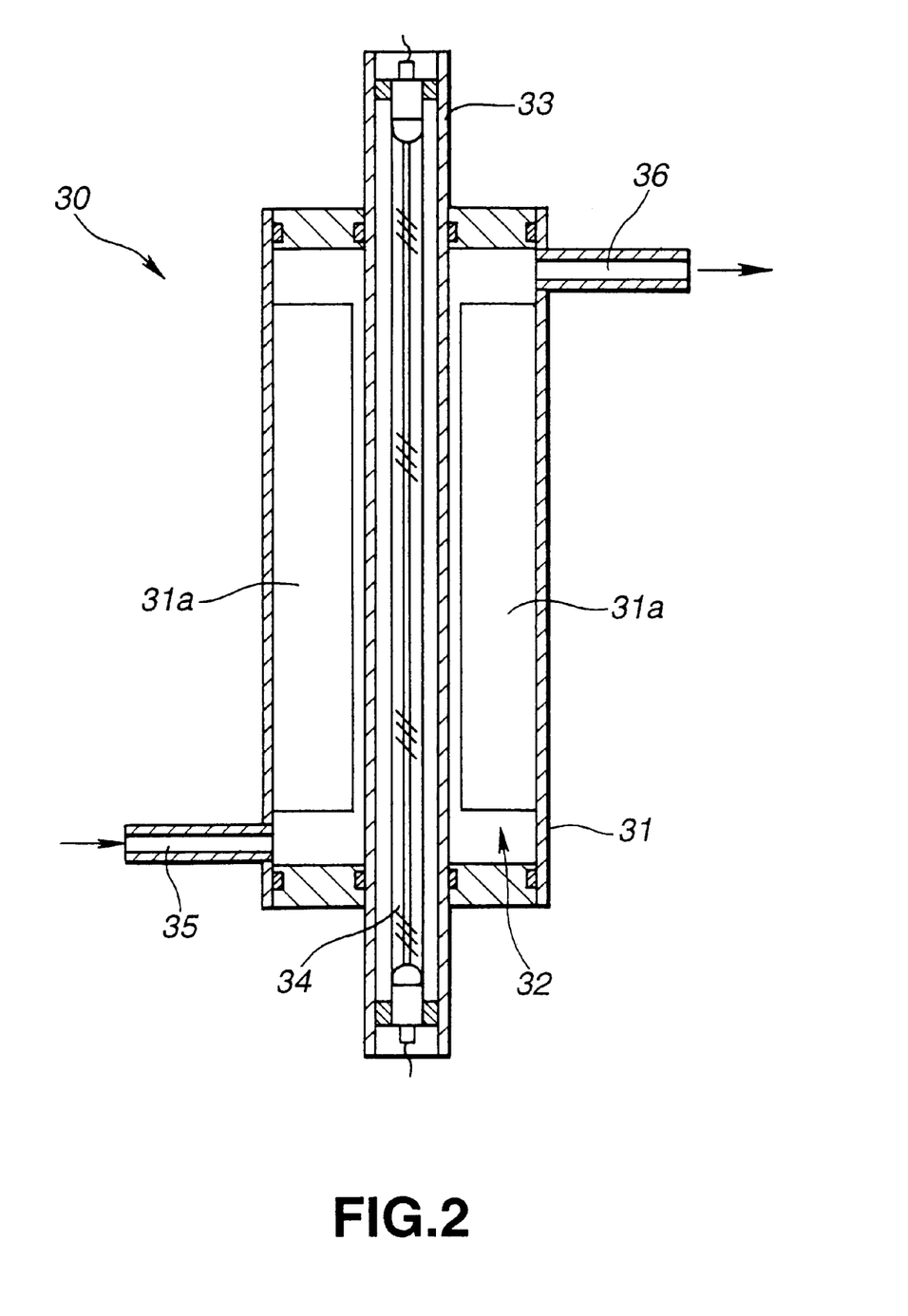
FIG. 2 is a sectional view showing the detailed structure of the halogen lamp heater illustrated in FIG. 1.

The halogen lamp heater 30 is a light heating system comprising a heater main unit 31, a transparent cylinder 33, and a halogen lamp 34. The heater main unit 31 has a semicircular shape having a base, and it comprises a plurality of radiating fins 31a on the inner circumference thereof. The transparent cylinder 33 is made from a material having extremely high optical transmissivity, such as quartz glass, or the like, and a cylindrical fluid heating passage 32 is formed between the transparent cylinder 33 and the heater main unit 31 by attaching it to the center portion of the heater main unit 31. The halogen lamp 34 is installed inside the transparent cylinder 33. This halogen lamp heater 30 is located in the fluid circulating and supplying system 3 in a position between the discharge outlet 2a of the fluid circulating and supplying pump 2 and the inlet 1b of the vacuum chamber, and the fluid heating passage 32 is connected to the fluid circulating and supplying system 3 via an inlet passage 35 and a discharge path 36. In a halogen lamp heater 30 of this kind, when the halogen lamp 34 is lit up, infrared rays emitted from the halogen lamp 34 are absorbed by thermal fluid passing through the fluid heating passage 32 or by the plurality of fins 31a, and the thermal fluid is heated by this radiated energy.

As shown in FIG. 1, in this temperature control device, a first flow control valve 40 is located in the fluid circulating and supplying system 3 in a position between the latent heat tank 20 and the fluid circulating and supplying pump 2. Moreover, the position between the discharge outlet 1a of the vacuum chamber 1 and the chiller 10 and the position between the first flow control valve 40 and the fluid circulating and supplying pump 2 are mutually connected by means of a bypass passage 50, and furthermore, a second flow control valve 60 is located in this bypass passage 50.

The flow control valves 40, 60 are driven by means of control signals from a valve control section 85 described hereinafter, and their respective degrees of opening are altered on the basis of the control signals and they perform the action of controlling, respectively, the flow-rate of the thermal fluid passing therethrough according to their respective degrees of opening.

Figure 3:
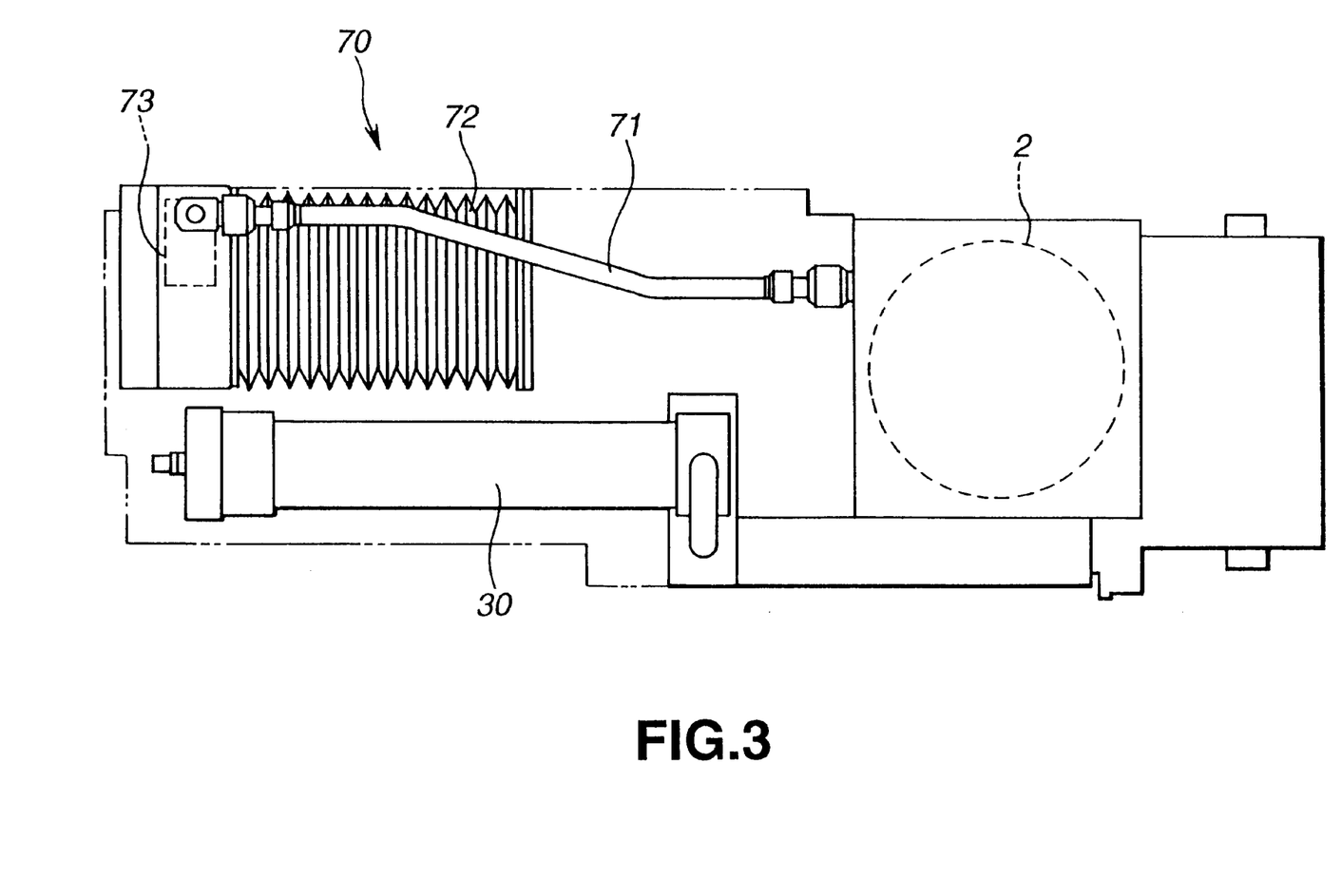
FIG. 3 is a diagram illustrating a concrete composition of pressure absorbing means shown in FIG. 3.

Moreover, in the temperature control device, pressure absorbing means 70 is connected to the confluence point x of the bypass passage 50 in the fluid circulating and supplying system 3. Pressure absorbing means 70 absorbs pressure fluctuations generated in the fluid circulating and supplying system 3 when the fluid circulating and supplying system 3 forms a closed circuit which is isolated completely from the external atmosphere. The pressure absorbing means 70 comprises a pressure absorber 72 which is linked to the fluid circulating and supplying system 3 via a pressure absorbing passage (connecting passage) 71, and a pressure control valve 73, which is located in this pressure absorbing passage 71. The pressure absorber 72 is a hermetically sealed vessel which is capable of changing volume readily in accordance with fluctuations in its internal pressure, such as a bellows tube as illustrated in FIG. 3. This pressure absorber 72 is connected to the pressure absorbing passage 71 in such a fashion that it closes off the open end of the pressure absorbing passage 71. The pressure control valve 73 is a valve for disconnecting the pressure absorber 72 from the fluid circulating and supplying system 3. In other words, when the fluid circulating and supplying pump 2 is operating, or when the fluid circulating and supplying pump 2 is halted and the internal pressure of the fluid circulating and supplying system 3 has exceeded a prescribed value, then the pressure control valve 73 assumes an ON state, and the pressure absorber 72 is connected to the fluid circulating and supplying system 3. On the other hand, when the fluid circulating and supplying pump 2 is halted and the internal pressure of the fluid circulating and supplying system 3 is below the prescribed value, then the pressure control valve 73 assumes an OFF state, and the connection between the pressure absorber 72 and the fluid circulating and supplying system 3 is interrupted.

Moreover, in the temperature control device, a pump bypass passage (supply bypass passage) 90 is provided in the fluid circulating and supplying system 3. The pump bypass passage 90 serves to supply a portion of the thermal fluid which has passed through the halogen lamp heater 30 to the inlet 2b of the fluid circulating and supplying pump 2. A third flow control valve 91 is positioned in this pump bypass passage 90. The third flow control valve 91 is a valve for controlling the flow-rate of thermal fluid passing through the pump bypass passage 90. In other words, when the pressure of the thermal fluid at the outlet 2a of the fluid circulating and supplying pump 2 rises above a predetermined value, the opening of the third flow control valve 91 increases, thereby raising the flow-rate of the thermal fluid passing through the pump bypass passage 90 above that of the thermal fluid supplied to the vacuum chamber 1. On the other hand, when the pressure of the thermal fluid at the outlet 2a of the fluid circulating and supplying pump 2 is below the predetermined value, then the opening of the third flow control valve 91 is set virtually to zero, in such a manner that the thermal fluid passing through the pump bypass passage 90 is virtually zero and nearly all the thermal fluid is supplied to the vacuum chamber 1.

On the other hand, the temperature control device also comprises a lamp control section (output control means) 80 and a valve control section (valve control means) 85.

The lamp control section 80 controls the output of the halogen lamp heater 30 on the basis of a previously specified target temperature and the temperature of the thermal fluid after it has passed through the halogen lamp heater 30, as detected by means of a temperature sensor 4. In concrete terms, the duty ratio and amount of light emitted when the lamp is lit are adjusted appropriately.

The valve control section 85 controls the respective degrees of opening of the first flow control valve 40 and the second flow control valve 60 on the basis of a lamp output control signal from the lamp control section 80, the target temperature, the temperature of the thermal fluid as detected by the temperature sensor 4, and the flow-rate of the thermal fluid as detected by a flow-rate sensor 5. The flow-rate sensor mentioned here serves to detect the flow-rate of thermal fluid passing through the confluence point Y of the bypass passage 50 in the fluid circulating and supplying system 3. The valve control section 85 sets and records, in a data series, at 1° C. intervals, correspondences between the target temperature, the combined temperature of the thermal fluid at confluence point X of bypass passage 50 in the fluid circulating and supplying system 3, and the degrees of opening of the respective flow control valves 40, 60 for achieving the combined temperature at the current flow-rate of the thermal fluid.

In a temperature control device composed as described above, when a target temperature is set or altered in accordance with processing to be conducted with respect to semiconductor wafers, the valve control section 85 uses the target temperature as a key to select a combined temperature of the thermal fluid corresponding to the target temperature from the data series, and respective degrees of opening for the flow control valves 40, 60 for achieving this combined temperature, and respective initial degrees of opening for the first flow control valve 40 and the second flow control valve 60 are set in such a manner that the combined temperature of the thermal fluid having passed through the chiller 10 and the thermal fluid having passed through the bypass passage 50 is slightly lower than the target temperature. For example, if the target temperature is the low-temperature state, then the first flow control valve 40 is set to a large degree of opening, whilst the second flow control valve 60 is set to the smallest possible degree of opening. Moreover, if the target temperature is the high-temperature state, then the first flow control valve 40 is set to the smallest possible degree of opening, whilst the second flow control valve 60 is set to a large degree of opening. Furthermore, if the target temperature is a medium-temperature state, then the first flow control valve 40 and the second flow control valve 60 are both set respectively to a half-open state.

When the initial degrees of opening for the first flow control valve 40 and the second flow control valve 60 have been set, the chiller 10 and the fluid circulating and supplying system 2 are actuated and a state is assumed where thermal fluid is circulated and supplied to the vacuum chamber 1. In other words, thermal fluid which has been cooled by the chiller 10 and thermal fluid which has passed through the device passage 50 are mixed in a ratio corresponding to the respective degrees of opening of the flow control valves 40, 60, and the mixed thermal fluid is then supplied to the vacuum chamber 1 after passing through the halogen lamp heater 30. On the other hand, the thermal fluid discharged from the vacuum chamber 1 is split into fluid which is to be supplied to the chiller 10 and fluid which is to be supplied to the bypass passage 50, again in a ratio corresponding to the degrees of opening of the flow control valves 40, 60.

Moreover, the lamp control section 80 and the valve control section 85 are activated and the output of the halogen lamp heater 30 is controlled by means of the lamp control section 80, whilst the degrees of opening of the first flow control valve 40 and the second flow control valve 60 are controlled respectively by means of the valve control section 85.

Below, the operation in a case where semiconductor wafers are controlled to a target temperature in a vacuum chamber 1 is described with reference to FIG. 4 which illustrates an embodiment of respective processing steps for the pump control section 80 and the valve control section 85.

Firstly, in the aforementioned temperature control device, the temperature of the thermal fluid discharged from the halogen lamp heater 30 is detected by the lamp control section 80 via a temperature sensor 4, at prescribed time intervals (step 100).

The lamp control section 80, having detected the temperature of the thermal fluid, then calculates the temperature difference between the detected temperature and the specified target temperature (step 101), and after carrying out appropriate PID (Proportional Integral and Derivative) calculations with respect to the temperature difference, the output of the halogen lamp heater 30 is adjusted in such a manner that the temperature difference between the two aforementioned temperatures becomes zero (step 102).

Having adjusted the output of the halogen lamp heater 30, the lamp control section 80 determines whether or not a prescribed valve control implementation cycle has been reached, for example, whether or not the number of output adjustment operations to the halogen lamp heater 30 has reached 10 (step 103), and if the number of output adjustment operations is less than 10, the procedure returns to step 100, and the aforementioned processing is repeated.

On the other hand, if the number of output adjustment operations to the halogen lamp heater 30 has reached 10, then the lamp control section 80 transfers processing to the valve control section 85.

At the valve control section 85 to which processing is transferred, the output of the halogen lamp heater 30 is detected on the basis of the lamp output control signal output from the lamp control section 80 (step 104), and moreover, it is determined whether or not the detected results lie within a previously determined output range (step 105).

If the output of the halogen lamp heater 30 lies with the aforementioned output range, in other words, in a state where the temperature of the thermal fluid can be controlled swiftly and reliably by means of the halogen lamp heater 30 alone, the valve control section 85 returns the procedure to step 100, without altering the respective degrees of opening of the first flow control valve 40 and the second flow control valve 60.

On the other hand, if the output of the halogen lamp heater 30 lies outside the aforementioned output range, in other words, if is determined due to factors such as marked temperature fluctuations produced in the thermal fluid returning to the vacuum chamber 1, that it is difficult to control the temperature of the thermal fluid swiftly and reliably by means of the halogen lamp heater 30 alone if this state continues, then the valve control section 85 changes the respective degrees of opening of the first flow control valve 40 and the second flow control valve 60 in such a manner that the output of the halogen lamp heater 30 immediately returns within the aforementioned output range (step 106), and when this processing is completed, the procedure returns to step 100.

For example, if the output of the halogen lamp heater 30 is greater than the aforementioned output range, then since the temperature of the thermal fluid is markedly lower than the target temperature, the valve control section 85 raises the combined temperature of the thermal fluid at confluence point X of the bypass passage 50 in the fluid circulating and supplying system 3, and it selects respective degrees of opening for the first flow control valve 40 and the second flow control valve 60 in order to achieve this raised combined temperature, by means of the aforementioned data series, such that the degree of opening of the first flow control valve 40 is reduced, whilst the degree of opening of the second flow control valve 60 is increased.

As a result, since the temperature of the thermal fluid supplied to the halogen lamp heater 30 is raised, the output of the halogen lamp heater 30 is reduced in the subsequent processing step of the lamp control section 80 and the output returns within the aforementioned output range.

Moreover, if, conversely, the output of the halogen lamp heater 30 is less than the aforementioned output range, this means that the temperature of the thermal fluid is in a high state, and therefore the valve control section 85 lowers the combined temperature of the thermal fluid at the confluence point X of the bypass passage 50 in the fluid circulating and supplying system 3, and it also selects the respective degrees of opening for the first flow control valve 40 and the second flow control valve 60 for achieving this modified combined temperature, by means of the aforementioned data series, such that the degree of opening of the first flow control valve 40 is increased, whilst the degree of opening of the second flow control valve 60 is reduced.

As a result, since the temperature of the thermal fluid supplied to the halogen lamp heater 30 is lowered, the output of the halogen lamp heater 30 is increased in the subsequent processing step of the lamp control section 80 and the output returns within the aforementioned output range.

Thereafter, the same processing is carried out repeatedly, and the temperature of the thermal fluid supplied to the vacuum chamber 1 is controlled continuously by means of the halogen lamp heater 30 and the two flow control valves 40, 60, whilst the fluid circulating and supplying pump 2 is in operation.

During the aforementioned operation, since it is possible always to supply thermal fluid to the vacuum chamber 1 directly after the temperature of the fluid has been adjusted such it assumes the target temperature by means of a halogen lamp heater 30 having good thermal response characteristics, it is therefore possible to control the temperature of semiconductor wafers accurately by means of the thermal fluid supplied in this manner.

Moreover, since, in a steady state, the temperature of the thermal fluid is adjusted simply by controlling the output of the halogen lamp heater 30, and the respective degrees of opening of the first flow control valve 40 and the second flow control valve 60 are controlled only in cases where the output of the halogen lamp heater 30 is outside a previously determined output range, the operation of these flow control valves 40, 60 is reduced as much as possible, which is advantageous from the viewpoint of durability.

Moreover, in the aforementioned temperature control device, since a latent heat tank 20 is placed in the path leading to the confluence point X of the bypass passage 50 in the fluid circulating and supplying system 3, then even supposing that temperature fluctuations are generated in the thermal fluid discharged by the chiller 10, it is possible to prevent adverse effects on the vacuum chamber 1 due to these temperature fluctuations, as far as possible. Moreover, since a latent heat tank 20 which is separate from the evaporator 11 is adopted, it is possible to use a latent heat tank 20 that is smaller in size, and since there is no need to provide a gas phase section and open the device to the atmosphere, the passages of the fluid circulating and supplying system 3 can be formed simply to a thick diameter. Furthermore, since the flow-rate of the thermal fluid discharged from the chiller 10 can be adjusted by appropriate alteration of the degrees of opening of the first flow control valve 40 and the second flow control -valve 60, then in cases where the target temperature is the aforementioned high-temperature state, it is not necessary to operate the chiller 10. Therefore, it becomes possible to raise the operational efficiency of the chiller 10, which generally has poor restarting characteristics, and also to achieve improved thermal response characteristics.

Moreover, in the aforementioned temperature control device, since a pressure absorber 72 is inserted in the fluid circulating and supplying system 3, a closed circuit wherein the fluid circulating and supplying system 3 is isolated completely from the external atmosphere can be achieved, and it is possible to prevent the occurrence of situations were thermal fluid which has evaporated and turned to gas due to pressure fluctuations leaks outside the system. Therefore, even in cases where expensive materials, such as Fluorinart, are used as the thermal fluid, it is possible to restrict increases in running costs due to resupplying of thermal fluid. Moreover, since this pressure absorber 72 is located immediately before the fluid circulating and supplying pump 2, it is possible to maintain a uniform pressure of the thermal fluid supplied to the fluid circulating and supplying pump 2. Consequently, it is possible to prevent the occurrence of cavitations in the fluid circulating and supplying pump 2 caused by induction of thermal fluid having a reduced pressure. Additionally, since the pressure absorber 72 is connected to the fluid circulating and supplying system 3 by means of a pressure absorbing passage 71, there is no risk of temperature fluctuations in the thermal fluid passing through the fluid circulating and supplying system 3 causing direct effects on the pressure absorber 72. Therefore, it becomes possible to use inexpensive materials, such as standard rubber, or the like, for the pressure absorber 72, without taking temperature fluctuations into consideration, and hence reductions in manufacturing costs can be achieved.

Incidentally, in a temperature control device comprising a pressure absorber 72 in a fluid circulating and supplying system 3 as described above, if, for example, the vacuum chamber 1 is located in an elevated position, or if the target temperature is a low-temperature state, then the internal pressure of the fluid circulating and supplying system 3 will rise when the fluid circulating and supplying pump 2 halts, and this risks bringing about situations where the pressure absorber 72 is damaged by the thermal fluid, or the thermal fluid leaks externally through the pressure absorber 72.

However, according to the aforementioned temperature control device, since the pressure control valve 73 is positioned between the fluid circulating and supplying system 3 and the pressure absorber 72, and the state of connection between the fluid circulating and supplying system 3 and the pressure absorber 72 is interrupted when the fluid circulating and supplying pump 2 is halted, it is possible reliably to prevent the occurrence of the aforementioned situations. Moreover, since the pressure control valve 73 allows a connection between the fluid circulating and supplying system 3 and the pressure absorber 72 even when the fluid circulating and supplying pump 2 is in a non-operational state, if the internal pressure of the fluid circulating and supplying system 3 exceeds a set value, then there is no risk of damage arising due to excessive pressure increase in the fluid circulating and supplying system 3 and the various devices located in this fluid circulating and supplying system 3.

Figure 4:
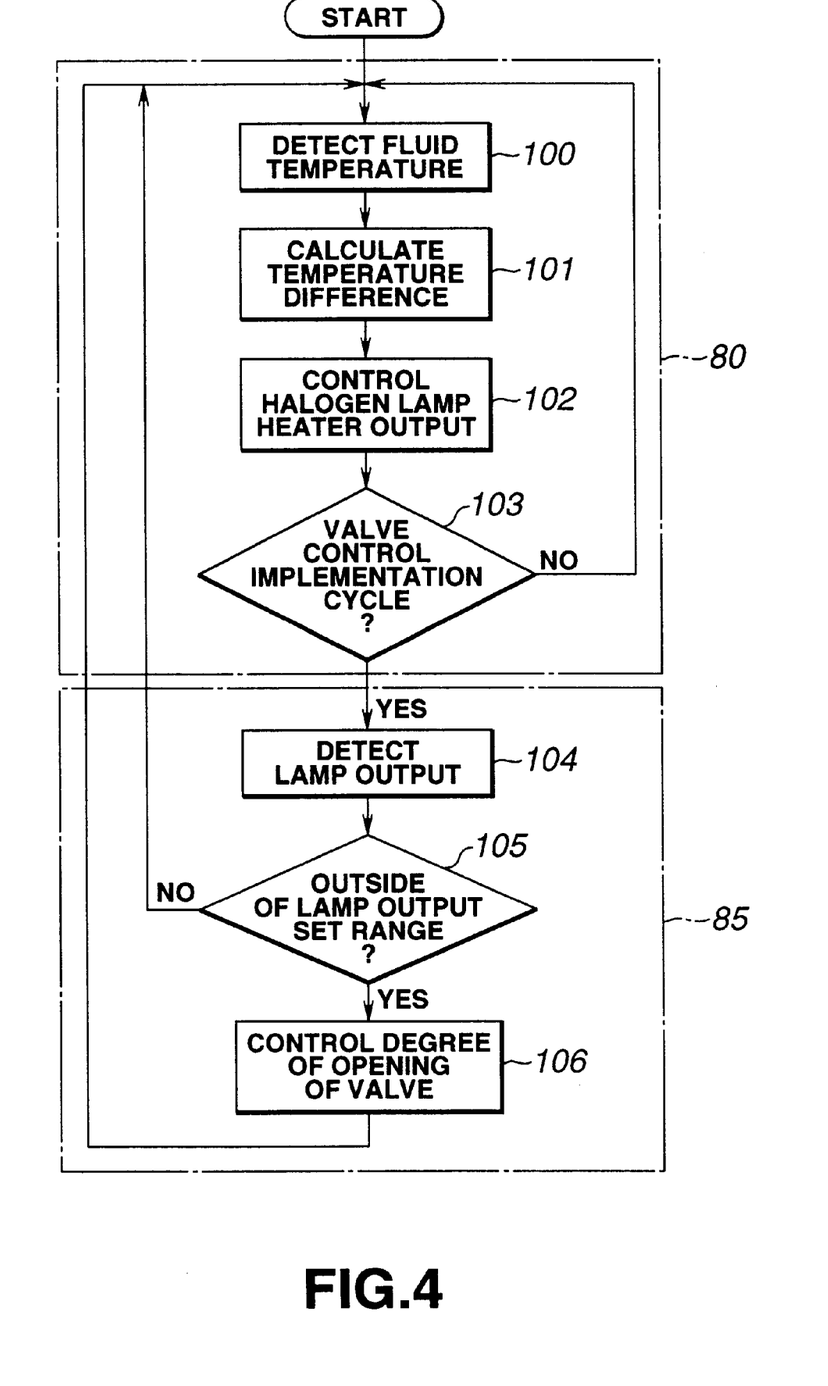
FIG. 4 is a flowchart showing an embodiment of respective processing sequences for the lamp control section and the valve control section illustrated in FIG. 1.

Moreover, although the embodiment illustrated in FIG. 4 relates to an example where the lamp control section 80 and the valve control section 85 carry out processing in series, it is also possible for the valve control section 85 to carry out processing in parallel with respect to the processing of the lamp control section 80. However, in the modification example illustrated in FIG. 5, it is necessary to set the cycle at which the temperature of the thermal fluid is detected by the lamp control section 80 and the cycle at which the output of the halogen lamp heater 30 is detected by the valve control section 85 in advance such that the lamp output detection cycle is greater than the thermal fluid detection cycle. In specific terms, if the fluid temperature detection cycle by the lamp control section 80 is set to a 0.1-second cycle, then the lamp output detection cycle by the valve control section 85 is set to a 1.0-second cycle.

Figure 5:
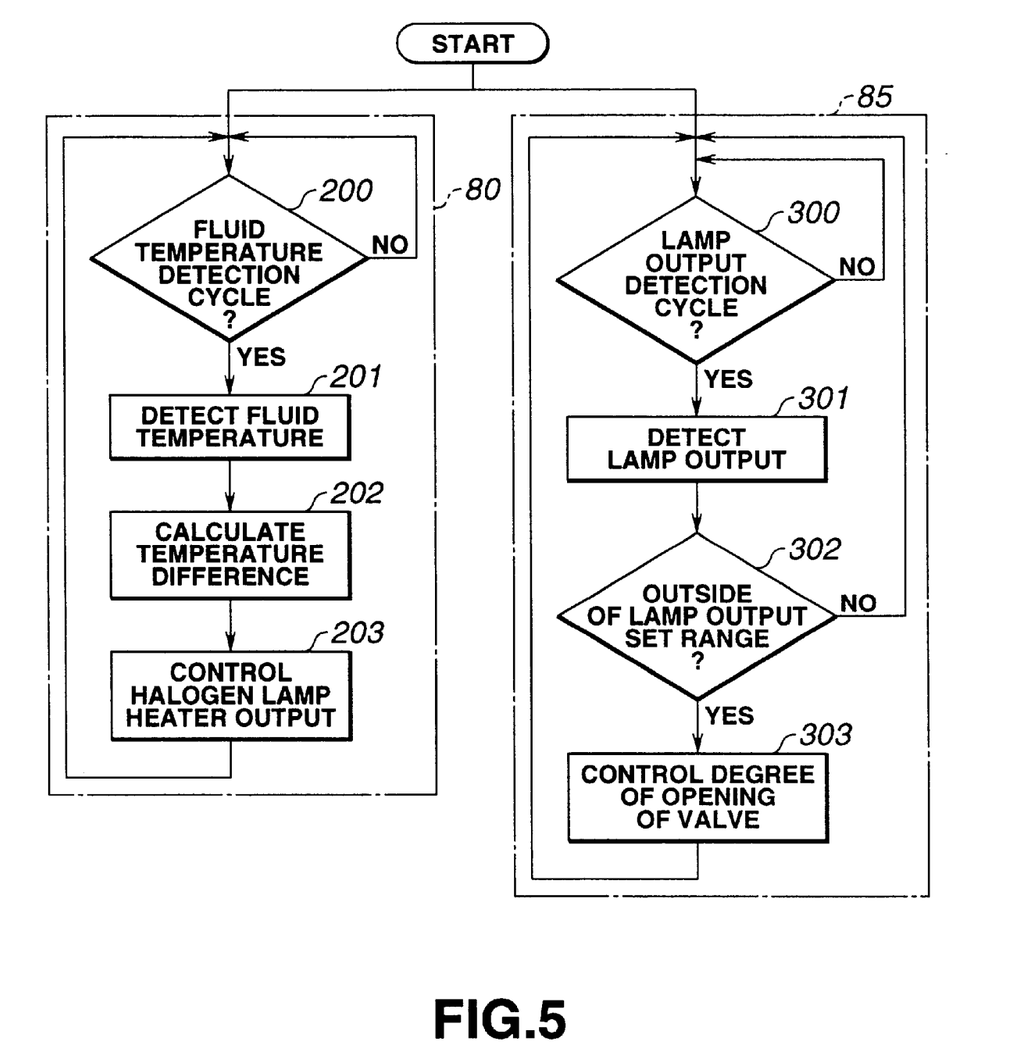
FIG. 5 is a flowchart showing a modification example of respective processing sequences for the lamp control section and the valve control section illustrated in FIG. 1.

Firstly, in the lamp control section 80 illustrated in FIG. 5, the temperature of the thermal fluid discharged from the halogen lamp heater 30 is detected by means of the temperature sensor 4 at intervals corresponding to the aforementioned fluid temperature detection cycle (step 200 and step 201).

Having detected the temperature of the thermal fluid, the lamp control section 80 calculates the detected temperature and the temperature difference between this and the specified target temperature (step 202), and it carries out appropriate PID (Proportional Integral and Derivative) calculations with respect to the temperature difference, whereupon it adjusts the output of the halogen lamp heater 30 in such a manner that the temperature difference between the two temperatures becomes zero (step 203).

Having adjusted the output of the halogen lamp heater 30, the lamp control section 80 returns the processing sequence directly to step 200, and it implements the processing described above repeatedly, until the various semiconductor processing relating to the semiconductor wafers has been completed.

On the other hand, at the valve control section 85 illustrated in FIG. 5, the output of the halogen lamp heater 30 is detected on the basis of the lamp output control signal from the lamp control section 80 at intervals corresponding to the aforementioned lamp output detection cycle (step 300 and step 301), and it is determined whether or not the detected output lies within a previously determined output range (step 302).

If the output of the halogen lamp heater 30 lies within the aforementioned output range, then the valve control section 85 returns the procedure to step 300, without altering the respective degrees of opening of the first flow control valve 40 and the second flow control valve 60.

On the other hand, if the output of the halogen lamp heater 30 lies outside the aforementioned output range, then the valve control section 85 alters the respective degrees of opening of the first flow control valve 40 and second flow control valve 60, in such a manner that the output of the halogen lamp heater 30 immediately returns within the aforementioned output range (step 303), and when this processing has been completed, the procedure is returned to step 300.

Thereafter, the operation described above is carried out repeatedly, and the temperature of the thermal fluid supplied to the vacuum chamber 1 is controlled continuously by means of the halogen lamp heater 30 and the two flow control valves 40, 60, whilst the fluid circulating and supplying pump 2 is in operation.

During the aforementioned operation, in this temperature control device also, it is possible always to supply thermal fluid to the vacuum chamber 1 directly after the temperature of the fluid has been adjusted such that the target temperature is achieved by means of a halogen lamp heater 30 having good thermal response characteristics, and therefore it is possible to control the temperature of semiconductor wafers accurately by means of the thermal fluid supplied in this manner.

Moreover, since, in a steady state, the temperature of the thermal fluid is adjusted simply by controlling the output of the halogen lamp heater 30, and the degrees of opening of the first flow control valve 40 and the second flow control valve 60 are controlled only in cases where the temperature deviation between the target temperature and the temperature of the thermal fluid as detected by the temperature sensor 4 lies outside a previously determined deviation range, or in cases where the output of the halogen lamp heater 30 lies outside a previously determined output range, then the operation of the flow control valves 40, 60 can be reduced as much as possible, which is extremely advantageous form the viewpoint of durability.

Moreover, in the first embodiment described above, flow ratio regulating means is constituted by a first flow control valve 40, which is located in the fluid circulating and supplying system 3 in a position between the chiller 10 and the confluence point X of the bypass passage 50, and a second flow control valve 60, which is located in the bypass passage 50, but the present invention is not limited to this.

Figure 6:
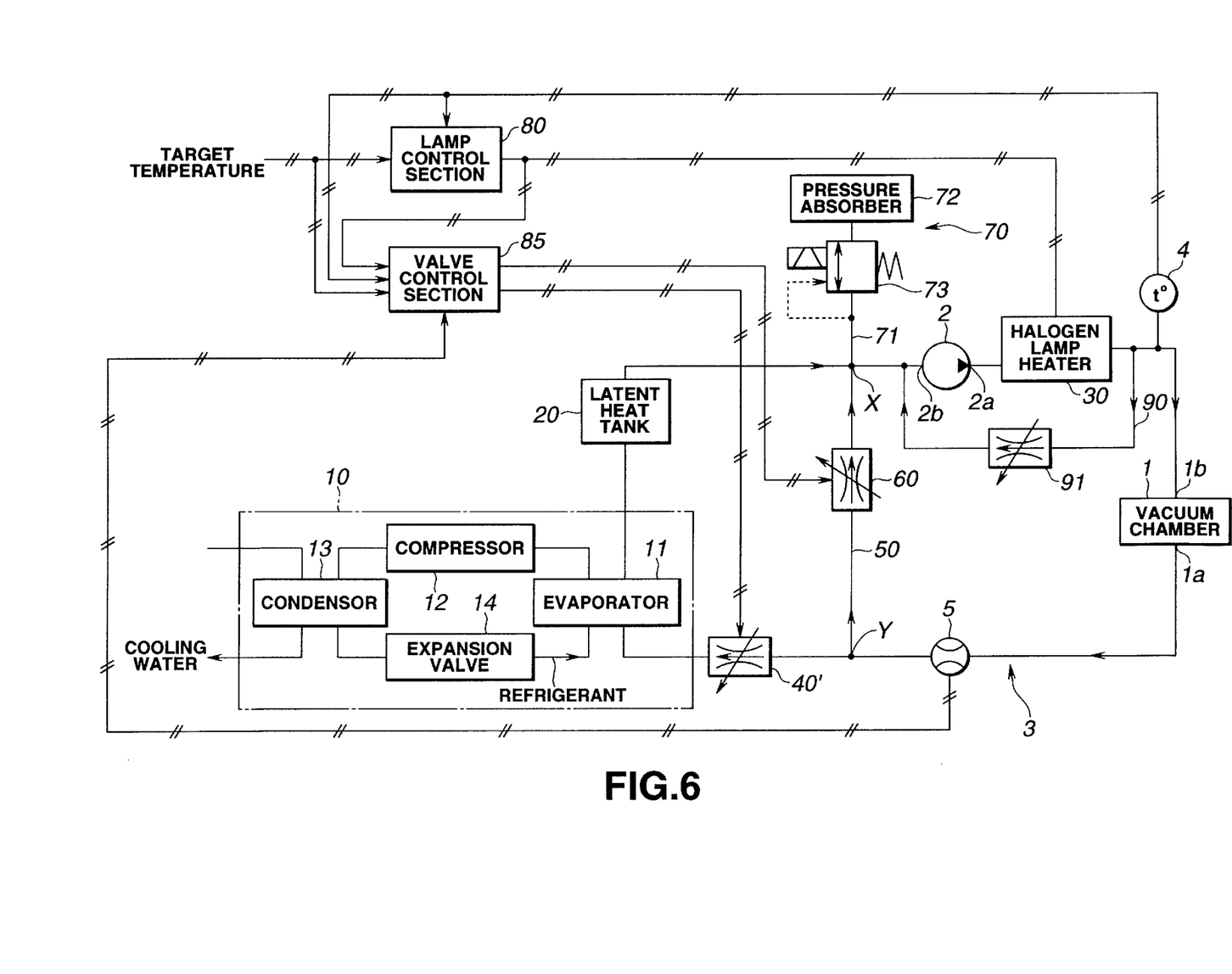
FIG. 6 is a circuit diagram showing a first modification example of the temperature control device illustrated in FIG. 1.

For example, as illustrated in a first modification example illustrated in FIG. 6, it is also possible to constitute flow ratio regulating means by a first flow control valve 40', which is located in a fluid circulating and supplying system 30 in a position between a confluence point Y with a bypass passage 50 and a chiller 10, and a second flow control valve 60 located in the bypass passage 50. Moreover, as illustrated in a second modification example illustrated FIG. 7, it is also possible to constitute flow ratio regulating means by a single three-way valve 45 positioned at the branching point of a bypass passage 50 in a fluid circulating and supplying system 3. Moreover, although not depicted in the drawings, if a three-way valve is used, it may also be positioned independently at the confluence point of a bypass passage 50 in a fluid circulating and supplying system 3.

Figure 7:
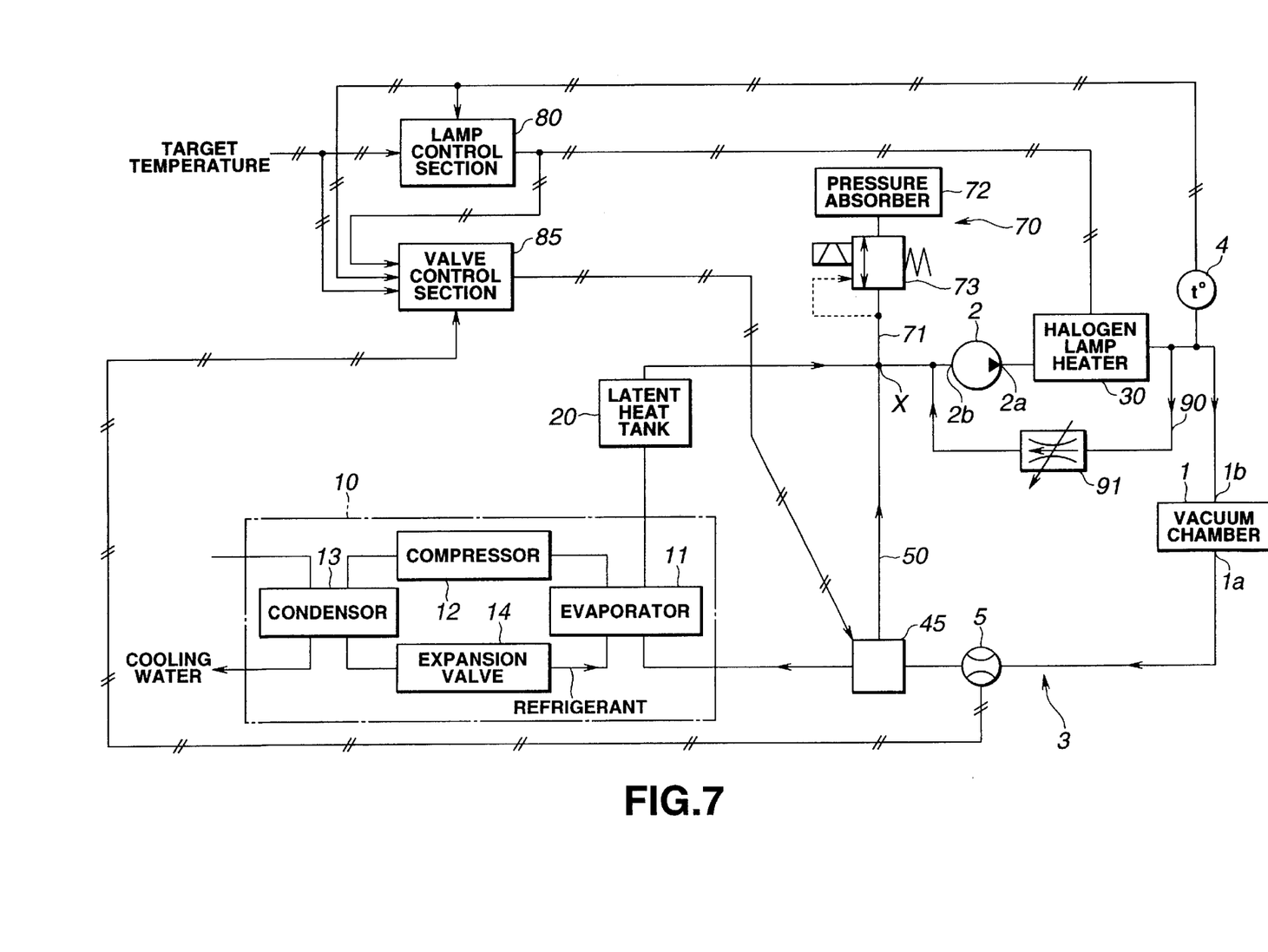
FIG. 7 is a circuit diagram showing a second modification example of the temperature control device illustrated in FIG. 1.

If flow ratio regulating means according to the first modification example illustrated in FIG. 6 and the second modification example illustrated in FIG. 7 are adopted, then it is possible to regulate the respective flow ratios for thermal fluid of the same temperature. Therefore, even if a fluid having a viscosity which changes significantly with change in temperature is used, it is still possible to regulate the respective flow ratios accurately, and the temperature of the semiconductor wafer can be controlled accurately also.

Moreover, in the first embodiment described above, since a pump bypass passage 90 is provided and thermal fluid is supplied to this pump bypass passage 90 when there is a significant pressure loss in the vacuum chamber 1, it is possible to reduce the load on the fluid circulating and supplying pump 2. In this case, the pump bypass passage 90 may be connected at any positioned, provided that thermal fluid in the fluid circulating and supplying system 3 between the fluid circulating and supplying pump 2 and the vacuum chamber 1 is split off and supplied to a position between the vacuum chamber 1 and the fluid circulating and supplying pump 2. For example, even if a pump bypass passage is provided in such a manner that thermal fluid immediately after discharge from the outlet 2a of the fluid supply pump 2 is fed to the inlet 2b of the fluid supply pump 2, then similar results can be anticipated.

Moreover, in cases where a pump bypass passage as illustrated in the first embodiment is adopted, the flow-rate of the thermal fluid to be adjusted by the flow ratio regulating means varies with the flow-rate of the thermal fluid passing through the pump bypass passage 90. Therefore, in order to control the temperature of the semiconductor wafer accurately, although the processing becomes complex, it is desirable that the flow-rate of the thermal fluid passing confluence point Y of the bypass passage 50 in the fluid circulating and supplying system 3 is detected by the flow-rate sensor 5, the detection result being used as a parameter for controlling the driving of the flow ratio regulating means.

Figure 8:
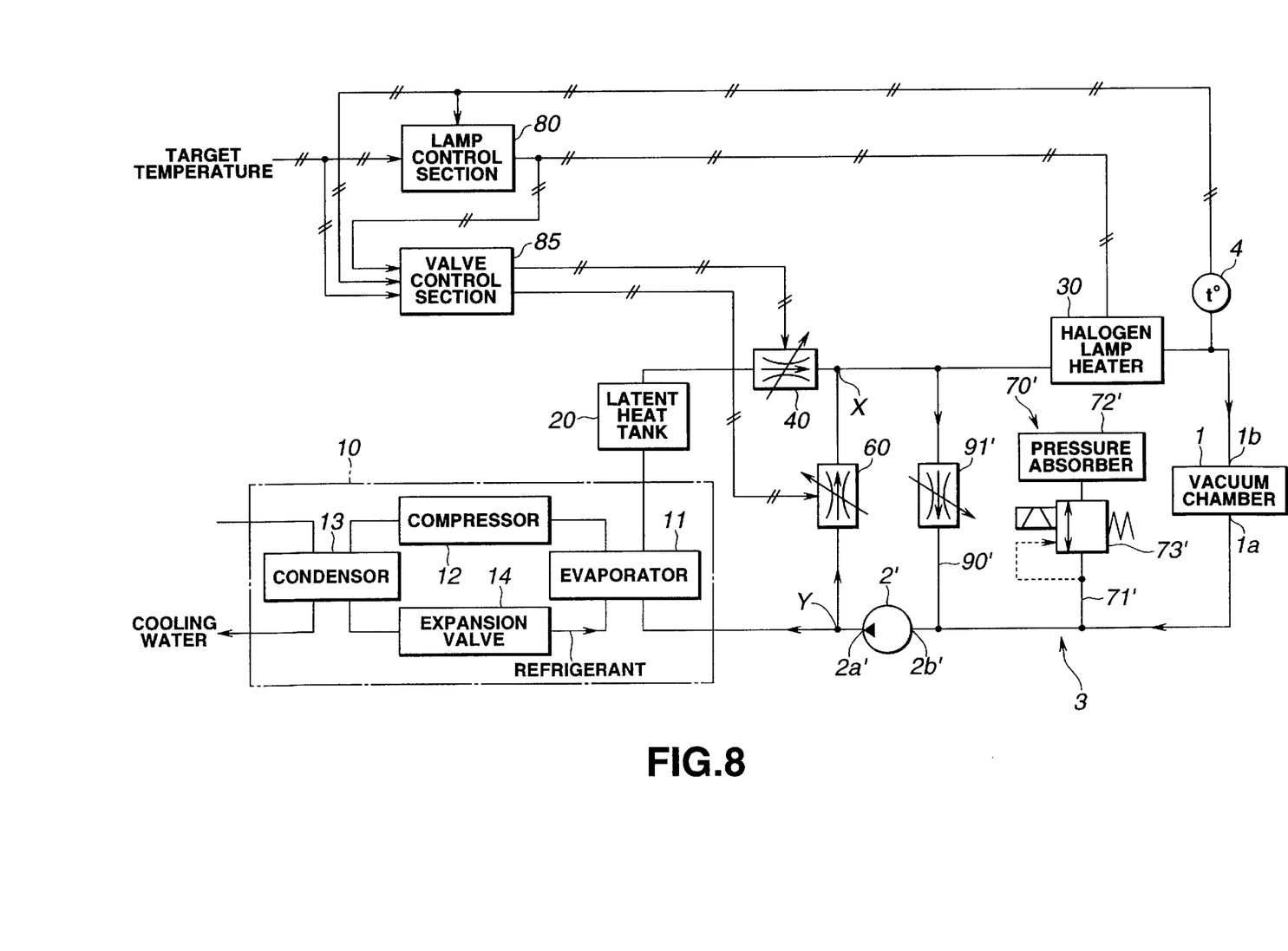
FIG. 8 is a circuit diagram showing a second embodiment of a temperature control device relating to the present invention.

FIG. 8 shows a second embodiment of a temperature control device designed to reduce the load on the fluid circulating and supplying pump, without complicating the aforementioned control of the flow ratio regulating valves.

In this temperature control device, the fluid circulating and supplying pump 2 which was positioned immediately after the confluence point X of bypass passage 50 in the fluid circulating and supplying system 3 in the first embodiment is moved to a position immediately before the branching point Y of the bypass passage 50 in the fluid circulating and supplying system 3. Further, along with the movement of the fluid circulating and supplying pump 2', a pressure absorbing means 70' is moved to a position between the vacuum chamber 1.

Moreover, a pump bypass passage 90' is provided in such a manner that thermal fluid between the confluence point X of the bypass passage 50 and the halogen lamp heater 30 in the fluid circulating and supplying system 3 is split off and supplied to a position between the pressure absorbing means 70' and the fluid circulating and supplying pump 2'. A third flow control valve 91' is placed in this pump bypass passage 90' in a similar manner to the first embodiment. The remainder of the composition is similar to the first embodiment, and therefore the same reference labels are applied and detailed description of the respective parts is omitted here. Furthermore, similarly to the first embodiment, the lamp control section 80 and valve control section 85 operate as illustrated by the embodiment in FIG. 4 or the modification example in FIG. 5. Moreover, similarly to the first embodiment, it is possible to adopt flow ratio regulating means as depicted in the first modification example illustrated in FIG. 6, or the second modification example illustrated in FIG. 7.

In the temperature control device constituted as shown above, it is possible always to supply thermal fluid to a vacuum chamber 1 immediately after the temperature of the fluid has been adjusted such it assumes a target temperature by means of a halogen lamp heater 30 having good thermal response characteristics, and therefore it is possible to control the temperature of semiconductor wafers accurately by means of the supplied thermal fluid.

Moreover, since, in a steady state, the temperature of the thermal fluid is regulated simply by controlling the output of the halogen lamp heater 30, and the degrees of opening of the first flow control valve 40 and the second flow control valve 60 are only controlled in cases where the temperature deviation between the target temperature and the temperature of the thermal fluid as detected by the temperature sensor 4 is outside a previously determined deviation range, or in cases where the output of the halogen lamp heater 30 lies outside a previously determined output range, then it is possible to reduce the operation of the flow control valves 40, 60 as much as possible, which is extremely advantageous from the viewpoint of durability.

Furthermore, since thermal fluid is supplied to a pump bypass passage 90' in cases where there is significant pressure loss in the vacuum chamber 1, it is possible to reduce the load on the fluid circulating and supplying pump 2'.

Moreover, according to the temperature control device described above, there is no change in the total flow-rate of the thermal fluid which is to be regulated by the flow control valves 40, 60, even if there is a change in the flow-rate of the thermal fluid passing through the pump bypass passage 90'. Therefore, when controlling the temperature of semiconductor wafers in an accurate manner, it is not necessary to use the flow-rate of the thermal fluid as a parameter and hence the processing for controlling the flow control valves 40, 60 is simplified. Needless to say, the flow-rate sensor 5 may be omitted.

If a pump bypass passage is adopted, whereby thermal fluid in the fluid circulating and supplying system 3 between the confluence point X of the bypass passage 50 and the vacuum chamber 1 is split off and supplied to a position between the vacuum chamber 1 and the branching point Y of the bypass passage 50, then operational results similar to those obtained in the second embodiment can be anticipated, whatever position the aforementioned pump bypass passage is connected to.

Each of the foregoing embodiments related to a temperature control device which circulates and supplies a thermal fluid from and to a vacuum chamber used for carrying out various semiconductor processing with respect to semiconductor wafers, in order that the semiconductor wafers are maintained constantly at a target temperature corresponding to the processing being carried out, by means of the supplied thermal fluid, but the present invention may also be applied to devices for controlling the temperature of other thermal fluids, such as thermal fluid supplied to a thermostatic chamber, or the like.

Moreover, each of the embodiments described above related to a case where the first heat exchanging means carried out cooling of the thermal fluid, and the second heat exchanging means carried out heating of the thermal fluid, but it is also possible to locate these heat exchanging means in a converse configuration. However, desirably, second heat exchanging means having excellent thermal response characteristics and capable of being altered readily in terms of their output should be used. Therefore, a halogen lamp heater was described as a device for heating the thermal fluid, but it is also possible to use another type of heater, provided that it satisfies the conditions stated above.

What is claimed is:

1. A temperature control device provided with a fluid circulating and supplying system for circulating and supplying a thermal fluid adjusted to a prescribed set temperature from and to an object whose temperature is to be controlled, which controls a temperature of the object whose temperature is to be controlled by means of the thermal fluid supplied by the fluid circulating and supplying system, comprising:

first heat exchanging means, located in the fluid circulating and supplying system, for carrying out heat exchange with thermal fluid returning from the object whose temperature is to be controlled;

second heat exchanging means, located in the fluid circulating and supplying system in a position leading from the first heat exchanging means to the object whose temperature is to be controlled, for adjusting the thermal fluid to the set temperature by carrying out heat exchange with thermal fluid passing therethrough;

a bypass passage for splitting and supplying thermal fluid in the fluid circulating and supplying system from a position leading from the object whose temperature is to be controlled to the first heat exchanging means, to a position leading from the first heat exchanging means to the second heat exchanging means; and flow ratio regulating means for regulating a flow ratio between the thermal fluid passing through the first heat exchanging means and the thermal fluid passing through the bypass passage.

2. The temperature control device according to claim 1, further comprising output controlling means for detecting a temperature of thermal fluid supplied to the object whose temperature is to be controlled and controlling an output of the second heat exchanging means on the basis of a detection result in such a manner that the temperature of the thermal fluid is adjusted to the set temperature; and flow ratio controlling means for detecting the output of the second heat exchanging means and controlling the drive of the flow ratio regulating means, in cases where the detection result lies outside a previously determined output range, in such a manner that the output of the second heat exchanging means moves within the output range.

3. The temperature control device according to claim 2, wherein the flow ratio controlling means detects the output of the second heat exchanging means in a sequential fashion after processing of the output controlling means has been completed.

4. The temperature control device according to claim 2, wherein, when the output controlling means is carrying out processing, the flow ratio controlling means detects the output of the second heat exchanging means, intermittently, in parallel with the processing of the output controlling means.

5. The temperature control device according to claim 1, wherein the first heat exchanging means is a chiller for cooling thermal fluid returning from the object whose temperature is to be controlled, and the second heat exchanging means is a halogen lamp heater for heating and adjusting thermal fluid supplied to the object whose temperature is to be controlled by means of a halogen lamp.

6. The temperature control device according to claim 1, wherein fluid combining means for combining thermal fluid which has passed through the first heat exchanging means is further provided in a position leading from the first heat exchanging means to a confluence point of the bypass passage in the fluid circulating and supplying system.

7. The temperature control device according to claim 1, wherein the flow ratio regulating means comprises: a first flow control valve located in the fluid circulating and supplying system in a position leading from a branching point of the bypass passage to a confluence point of the bypass passage; and a second flow control valve located in the bypass passage.

8. The temperature control device according to claim 1, wherein the flow ratio regulating means is a three-way valve located either at a branching point of the bypass passage or at a confluence point of the bypass passage, in the fluid circulating and supplying system.

9. The temperature control device according to claim 1, wherein the fluid circulating and supplying system further comprises, in a position leading from a confluence point of the bypass passage to a branching point of the bypass passage, fluid circulating and supplying means for circulating the thermal fluid; and pressure absorbing means, located in a position immediately before the fluid circulating and supplying means, for absorbing pressure fluctuations in the thermal fluid occurred in the fluid circulating and supplying system.

10. The temperature control device according to claim 9, wherein the pressure absorbing means comprises: a connecting passage linked to the fluid circulating and supplying system; and a pressure absorber coupled to the fluid circulating and supplying system via the connecting passage, for absorbing pressure fluctuations in the thermal fluid by means of changing its volume.

11. The temperature control device according to claim 1, wherein the fluid circulating and supplying system further comprises, in a position leading from a confluence point of the bypass passage to a branching point of the bypass passage, fluid circulating and supplying means for circulating the thermal fluid; and a supply bypass passage for splitting and supplying thermal fluid in the fluid circulating and supplying system from a position leading from the fluid circulating and supplying means to the object whose temperature is to be controlled, to a position leading from the object whose temperature is to be controlled to the fluid circulating and supplying means.

12. The temperature control device according to claim 11, wherein the supply bypass passage splits and supplies thermal fluid in the fluid circulating and supplying system from a position leading from the confluence point of the bypass passage to the object whose temperature is to be controlled, to a position leading from the object whose temperature is to be controlled to the branching point of the bypass passage.

13. A temperature control method for controlling a temperature of an object whose temperature is to be controlled by means of a thermal fluid supplied by a fluid circulating and supplying system, wherein the fluid circulating and supplying system which circulates and supplies thermal fluid from and to the object whose temperature is to be controlled contains: first heat exchanging means for carrying out heat exchange with thermal fluid returning from the object whose temperature is to be controlled; second heat exchanging means located in a position leading from the first heat exchanging means to the object whose temperature is to be controlled, for carrying out heat exchange with thermal fluid passing therethrough; a bypass passage for splitting and supplying thermal fluid in the fluid circulating and supplying system from a position leading from the object whose temperature is to be controlled to the first heat exchanging means, to a position leading from the first heat exchanging means to the second heat exchanging means; and flow ratio regulating means for regulating a flow ratio between the thermal fluid passing through the first heat exchanging means and the thermal fluid passing through the bypass passage; the temperature control method comprising:

output controlling step of detecting a temperature of the thermal fluid supplied to the object whose temperature is to be controlled and controlling an output of the second heat exchanging means on the basis of the detected temperature in such a manner that the thermal fluid supplied to the object whose temperature is to be controlled is adjusted to a prescribed set temperature;

output detecting step of detecting the output of the second heat exchanging means after the output controlling step has been completed; and flow ratio controlling step of controlling the drive of the flow ratio regulating means, in cases where the detected output lies outside a previously determined output range, in such a manner that the output of the second heat exchanging means moves within the output range.

14. A temperature control method for controlling a temperature of an object whose temperature is to be controlled by means of a thermal fluid supplied by a fluid circulating and supplying system, wherein the fluid circulating and supplying system which circulates and supplies thermal fluid from and to the object whose temperature is to be controlled contains: first heat exchanging means for carrying out heat exchange with thermal fluid returning from the object whose temperature is to be controlled; second heat exchanging means located in a position leading from the first heat exchanging means to the object whose temperature is to be controlled, for carrying out heat exchange with thermal fluid passing therethrough; a bypass passage for splitting and supplying thermal fluid in the fluid circulating and supplying system from a position leading from the object whose temperature is to be controlled to the first heat exchanging means, to a position leading from the first heat exchanging means to the second heat exchanging means; and flow ratio regulating means for regulating a flow ratio between the thermal fluid passing through the first heat exchanging means and the thermal fluid passing through the bypass passage; the temperature control method comprising:

output controlling step of detecting a temperature of the thermal fluid supplied to the object whose temperature is to be controlled and controlling an output of the second heat exchanging means on the basis of the detected temperature in such a manner that the thermal fluid supplied to the object whose temperature is to be controlled is adjusted to a prescribed set temperature; output detecting step of detecting the output of the second heat exchanging means, intermittently, in parallel with the output controlling step; and flow ratio controlling step of controlling the drive of the flow ratio regulating means, in cases where the detected output lies outside a previously determined output range, in such a manner that the output of the second heat exchanging means moves within the output range.

* * * * *